Oct. 10, 1967 R. O. WESCOTT 3,346,286
COMPONENT MOUNTING EMPLOYING A THREADED
BOLT DRIVEN AT ITS THREADED END
Filed Aug. 31, 1965

INVENTOR
RONALD O. WESCOTT

BY

ATTORNEY

United States Patent Office 3,346,286
Patented Oct. 10, 1967

3,346,286
COMPONENT MOUNTING EMPLOYING A THREADED BOLT DRIVEN AT ITS THREADED END
Ronald O. Wescott, Edison, N.J., assignor to Burroughs Corporation, Detroit, Mich., a corporation of Michigan
Filed Aug. 31, 1965, Ser. No. 484,057
4 Claims. (Cl. 287—189.36)

This invention relates to a fastener and more particularly to a mounting employing a threaded bolt for fastening small electrical components to a chassis.

Miniaturization is a frequent requirement in present day electrical and electronic equipment. One way to reduce the size of electronic equipment is to reduce inter-component spacing. Tube sockets, transistors and other electronic components are usually mounted on a chassis or base by means of a flange which is fastened onto the base by means of a threaded bolt. Almost universally this involves a threaded aperture in the base and a threaded bolt with a slotted head. The bolt is driven through the component flange into the base with a turning tool such as a screwdriver. Due to the presence of the slotted head, the center line of the aperture on the component flange must be located farther from the component itself than would be necessary if the head were eliminated. If removal of the component becomes necessary and the bolt is unscrewed, it becomes separated from both component and base and may be easily mislaid.

It is therefore an object of this invention to provide a component mounting which reduces the required component size by eliminating the head from the component end of the fastener.

It is another object of this invention to provide a component fastener which cannot be mislaid when the component is removed for repairs.

The above and other objects are achieved by a novel fastener using a threaded bolt with driving means being provided at its threaded end. The component to be mounted has a threaded aperture. The base upon which the component is to be mounted has an aperture aligned with the threaded aperture. A bolt which is typically threaded only at one end extends through the aperture in the base with its threaded end extending into the threaded aperture in the component. Means are provided for limiting travel of the bolt toward the component. Such means may be a head at the bottom of the bolt where it causes no interference with the component. Means are also provided on the top or component end of the bolt for turning the bolt. This may be a recess such as a screwdriver slot.

To mount the component, a turning tool such as a screwdriver is inserted through the threaded aperture in the component and into engagement with the recess in the bolt. As the bolt is turned, the component rides up on the threads of the bolt and is secured against the base.

While some of the objects and a brief description of the invention have been given above, the invention and its objects will be best understood by referring to the following detailed description and to the accompanying drawings wherein.

Figure 1:
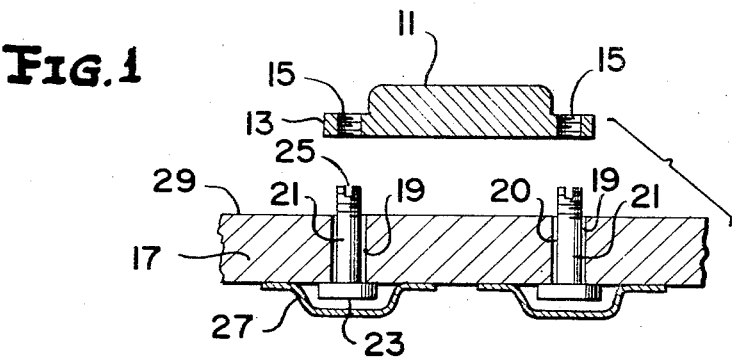
FIG. 1 is a partially broken away side view of one embodiment of the invention.

FIG. 1 illustrates one embodiment of the subject invention wherein a component, such as transistor 11 is shown in position to be mounted. Flange 13 of transistor 11 is provided with two threaded apertures 15. The base, or chassis 17 upon which transistor 11 is to be mounted has two apertures 19, in alignment with the threaded apertures 15 of the transistor. Bolt 21 having a head 23 at one end and a slot 25 at the other end extends through aperture 19 of the chassis, with the head 23 being disposed at the bottom of the chassis so as to limit movement of the bolt toward the component to be mounted.

Shield 27 is disposed at the bottom of base 17 for retaining the bolt within the base when the bolt is not in engagement with the component to be mounted. This latter feature may be dispensed with where miniaturization is the sole object and retention of the bolt is not required.

Aperture 19 is smooth as is portion 20 of the bolt 21 disposed therein, so as to permit free turning of the bolt.

To mount the component 11, a turning tool such as a screwdriver is inserted in the slot 25 through the aperture 15 and a slight pressure is applied to the component to initiate engagement of the threaded end of bolt 21 with the threaded aperture 15.

As the bolt is turned by the screwdriver, the component 11 is drawn along the threads of the bolt 21 against face 29 of chassis 17. It should be noted that instead of a slot the recess in the bolt may be shaped to receive an Allen head wrench or some other turning tool.

Additionally, instead of a recess in the end of the bolt a raised portion may be provided on the bolt which would be adapted for engagement by a small tubular wrench.

Figure 2:
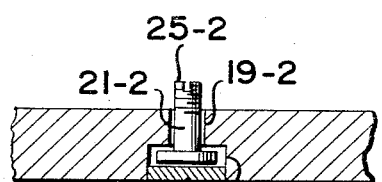
FIG. 2 is a partially broken away side view of a second embodiment of the invention.

FIG. 2 illustrates a modification of the fastener shown in FIG. 1 with corresponding parts being designated by similar numbers having the suffix 2. Bolt 21-2 used in FIG. 2 is similar to bolt 21 used in FIG. 1 except that 21-2 is somewhat shorter. The purpose of the modification shown in FIG. 2 is to eliminate the projection caused by the retaining means 27 of FIG. 1. In place of shield 27 there is provided a countersunk portion 31 at the bottom of the aperture 19. Plug 33, which may be either metal or a deformable material such as plastic, is pressed into the countersunk portion 31 to retain bolt 21-2 within aperture 19-2.

Figure 3:
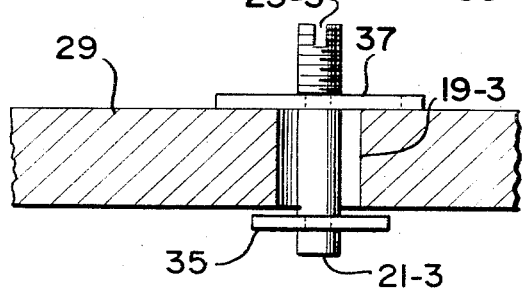
FIG. 3 is a partially broken away side view of a third embodiment of the invention.

FIG. 3 shows still another modification of the basic fastener shown in FIG. 1 wherein the head 23 is replaced by a spring clip 35. Additionally, in FIG. 3 the shield 27 of FIG. 1, whose function it was to retain the bolt 21 within aperture 19 is replaced by a second spring clip 37 mounted on bolt 21-3 just below its threaded portion.

Figure 3A:
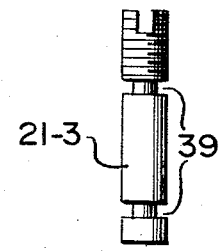
FIG. 3(a) is a side view of the bolt used in the fastener of FIG. 3.

As may be better seen in FIG. 3(a), bolt 21-3 is cylindrical with spaced apart reduced portions or circular slots 39 being provided to receive and to retain spring clips 35 and 37.

Figure 4:
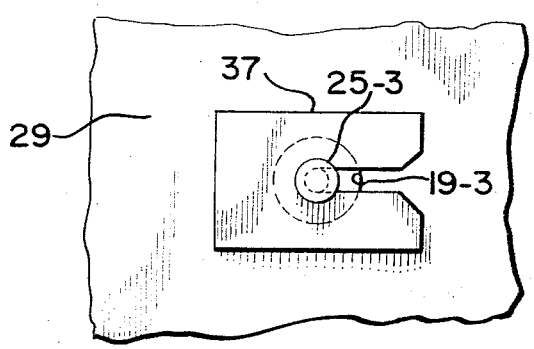
FIG. 4 is a bottom view of the third embodiment of the invention.

A typical configuration for the spring clips 37 appears in FIG. 4 but obviously other spring configurations may be employed equally well.

Figure 5:
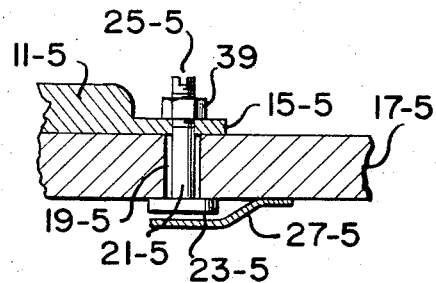
FIG. 5 is a partially broken away side view of a fourth embodiment of the invention.

The embodiment shown in FIG. 5 is directed to those situations in which the problem is not the lack of space near the component to be mounted, but rather it is the inaccessibility of the rear side of the plate upon which the article is to be mounted. It is often desirable for greater strength to mount an article on a plate by means of a bolt having threads at one end and a nut mounted upon the threaded end of the bolt. Where the rear end of the plate supporting the article is inaccessible, it be-

3 comes difficult to prevent the bolt from turning while the nut is being tightened in place. A fastener which obviates this problem is shown in FIG. 5 wherein an article 11–5 having a clear aperture 15–5 is mounted upon a plate 17–5 having a clear aperture 19–5 in alignment with aperture 15–5. Bolt 21–5 extends through aperture 19–5 and through aperture 15–5 with its threaded end protruding beyond the aperture 15–5. Bolt 21–5 is held in place by the flange 27–5 fastened upon the plate 17–5. Nut 39 is screwed upon the threaded portion of bolt 21–5 and 21–5 is prevented from turning, while the nut 39 is being tightened, by a screwdriver or a similar implement inserted in slot or recess 25–5.

While my invention has been disclosed through several embodiments, it is not intended that these embodiments be taken as exhaustive. Other configurations and modifications may occur to those skilled in the fastener art without departing from the scope of my invention.

What I claim is:

1. A fastening device including an electronic component and a base member to be held together,
   the base member having two opposite sides extending in substantially parallel planes and a plurality of unthreaded apertures therethrough opening out through said opposite sides;
   the component having a flange overlying one of said sides of the base member and further having a plurality of apertures extending through the flange in alignment with the apertures of the base member;
   a plurality of bolts with one of said bolts introduced through each set of said aligned apertures from the side of the base member opposite to the component, each bolt having a threaded end section and being of such a length that when substantially fully inserted into aligned apertures its threaded section projects from the component side of the base member;
   means on each bolt forming a head on the end thereof opposite to its threaded end section and engageable with a side portion of the base member remote to the component for limiting bolt travel towards the component;
   the threaded end section on each of said bolts being shaped to receive a tool for turning the same;
   retaining means engaging each bolt and said base member and being secured to one so that each bolt is held from any substantial movement in the direction away from the component and therefore is supported with its threaded end section in projecting relation to the base member and enters the aligned aperture of the component; and
   said retaining means and said head forming means cooperating together to hold each bolt from substantial axial travel while permitting the bolt to be rotated by a tool engaging the threaded end thereof for performing a threading operation which draws the flange of the component securely to the base member.

2. A fastening device including an electronic component and a base member to be held together,
   the base member having two opposite sides extending in substantially parallel planes and a plurality of unthreaded apertures therethrough opening out through said opposite sides;
   the component having a flange overlying one of said sides of the base member and further having a plurality of threaded apertures extending through the flange in alignment with the apertures of the base member;
   a plurality of bolts with one of said bolts introduced through each set of said aligned apertures from the side of the base member opposite to the component, each bolt having a threaded end section and being of such a length that when substantially fully inserted into the aligned apertures its threaded section projects from the component side of the base member;
   means on each bolt forming a head on the end thereof opposite to its threaded end section and engageable with a side portion of the base member remote to the component for limiting bolt travel towards the component;
   the threaded end section on each of said bolts being shaped to receive a tool for turning the same;
   retaining means carried by the base member and overlying the head end of said bolts so that each bolt is held from any substantial movement in the direction away from the component and therefore is supported with its threaded end section in projecting relation to the base member and enters the aligned aperture of the component; and
   said retaining means and said head forming means cooperating to hold each bolt from substantial axial travel while permitting the bolt to be rotated by a tool engaging the threaded end thereof for threading the bolt in the threaded aperture of the flange of the component.

3. A fastening device including an electronic component and a base member to be held together,
   the base member having two opposite sides extending in substantially parallel planes and a plurality of unthreaded apertures therethrough opening out through said opposite sides;
   the component having a flange overlying one of said sides of the base member and further having a plurality of apertures extending through the flange in alignment with the apertures of the base member;
   a plurality of bolt rods introduced through said aligned apertures from the side of the base member opposite to the component, each bolt rod having a threaded end section and being of such a length that when substantially fully inserted into the aligned apertures its threaded section projects from the component side of the base member;
   each of said bolt rods having two circular slots spaced apart so one is located on either side of the base and immediately adjacent thereto;
   a spring clip retractably received in each slot and overlying the adjacent side of the base so that the bolt rod is locked against substantial axial travel but is otherwise free to rotate about its axis, and
   means on the threaded end of each bolt rod for receiving a turning tool for accomplishing a threading operation for securely drawing the component to the base member.

4. A fastening device including an electronic component and a base member to be held together,
   the base member having two opposite sides extending in substantially parallel planes and a plurality of unthreaded apertures therethrough opening out through said opposite sides;
   the component having a flange overlying one of said sides of the base member and further having a plurality of unthreaded apertures extending through the flange in alignment with the apertures of the base member;
   a plurality of bolts introduced through said aligned apertures from the side of the base member opposite to the component, each bolt having a threaded end section and being of such a length that when substantially fully inserted into the aligned apertures its threaded section protrudes beyond the flange of the component;
   means on each bolt forming a head on the end thereof opposite to its threaded end section and engageable with a side portion of the base member remote to the component for limiting bolt travel towards the component;
   a plurality of nuts, one threaded onto the protruding threaded end of each bolt for clamping said component to the base member, the threaded end of each bolt being shaped to receive a tool to prevent turning of the bolt when the nut is tightened thereon; and retaining means carried by the base and overlying each bolt head for supporting the bolt so that its threaded end section not only protrudes beyond the component flange but also holds the bolt substantially against axial travel away from the component.

References Cited

UNITED STATES PATENTS

| | | | |
|---|---|---|---|
| 1,026,035 | 5/1912 | Hedden | 151—69 |
| 1,150,578 | 8/1915 | Cornell | 85—9 |
| 1,200,297 | 10/1916 | Bates | 151—41.71 |
| 1,251,772 | 1/1918 | Guett | 85—8.6 |
| 1,491,394 | 4/1924 | Griffith et al. | 85—1 |
| 1,990,234 | 2/1935 | Kemper | 85—7 |
| 2,363,006 | 11/1944 | Klaus | 151—41.7 |
| 2,643,573 | 6/1953 | Johnson | 151—69 |
| 2,737,222 | 3/1956 | Becker | 151—69 |
| 2,933,970 | 4/1960 | Pagano | 85—8.8 |
| 3,001,252 | 9/1961 | Erickson et al. | 151—69 |
| 3,124,190 | 3/1964 | Cornell | 151—69 |
| 3,170,473 | 2/1965 | Downs et al. | 151—69 |
| 3,259,346 | 7/1966 | Rogers | 85—8.8 |

CARL W. TOMLIN, *Primary Examiner.*

EDWARD C. ALLEN, *Examiner.*

M. PARSONS, Jr. *Assistant Examiner.*